US011030441B2

(12) United States Patent
Chan et al.

(10) Patent No.: US 11,030,441 B2
(45) Date of Patent: Jun. 8, 2021

(54) CUSTOMER TRACKING AND INVENTORY MANAGEMENT IN A SMART STORE

(71) Applicant: INTERNATIONAL BUSINESS MACHINES CORPORATION, Armonk, NY (US)

(72) Inventors: Yuk L. Chan, Rochester, NY (US); Heidi Lagares-Greenblatt, Jefferson Hills, PA (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

(21) Appl. No.: 15/989,344

(22) Filed: May 25, 2018

(65) Prior Publication Data
US 2019/0362135 A1 Nov. 28, 2019

(51) Int. Cl.
G06K 9/00 (2006.01)
G06Q 10/08 (2012.01)
(Continued)

(52) U.S. Cl.
CPC ....... *G06K 9/00288* (2013.01); *G06F 16/285* (2019.01); *G06Q 10/087* (2013.01); *G06T 7/20* (2013.01); *H04N 7/18* (2013.01)

(58) Field of Classification Search
CPC ............ G06Q 30/0601; G06Q 20/206; G06Q 20/40145; G06Q 30/0633; G06Q 30/0603; G06Q 30/0605; G06Q 30/0635; G06Q 30/0641; G06Q 40/12; G06Q 50/01; G06Q 90/20; H04W 4/029; H04W 4/08; H04W 4/023; H04W 4/027; H04W 4/21;
(Continued)

(56) References Cited

U.S. PATENT DOCUMENTS 3,878,365 A 4/1975 Schwartz
6,327,576 B1 12/2001 Ogasawara
(Continued)

OTHER PUBLICATIONS

Anonymous "Method and System of Smart Shopping using an Active Shelf", IP.com; IP.com No. IPCOM000208797D; Publication Date: Jul. 18, 2011; 3 pgs.
(Continued)

*Primary Examiner* — Golan Sorowar
(74) *Attorney, Agent, or Firm* — Cantor Colburn LLP; Teddi Maranzano

(57) ABSTRACT

Methods, systems and computer program products for identifying customer groupings in a smart store are provided. Aspects include detecting a plurality of customers in the smart store and retrieving stored associations for at least one of the plurality of customers from a customer database based on data captured for each of the plurality of customers. Aspects also include tracking a movement of each of the plurality of customers through the smart store and updating the stored associations in the customer database between two or more of the plurality of customers that are determined to be shopping together based on their movement through the smart store. Aspects further include charging a single customer of the plurality of customers for items removed from the smart store by another customer based on the stored associations.

14 Claims, 8 Drawing Sheets

(51) Int. Cl.
*H04N 7/18* (2006.01)
*G06T 7/20* (2017.01)
*G06F 16/28* (2019.01)

(58) Field of Classification Search
CPC ........... H04W 4/30; H04W 4/70; H04W 4/80; H04W 84/18; H04W 8/186
See application file for complete search history.

(56) References Cited

U.S. PATENT DOCUMENTS

| | | | |
|---|---|---|---|
| 6,657,543 | B1 | 12/2003 | Chung |
| 7,100,824 | B2 | 9/2006 | Ostrowski et al. |
| 7,239,241 | B2 | 7/2007 | Claudatos et al. |
| 8,732,024 | B2 | 5/2014 | Jacobs |
| 9,137,500 | B1 | 9/2015 | Wachman et al. |
| 9,715,672 | B2 | 7/2017 | Daily et al. |
| 2003/0018897 | A1 | 1/2003 | Bellis, Jr. et al. |
| 2012/0310657 | A1 | 12/2012 | Jankowski et al. |
| 2014/0244834 | A1* | 8/2014 | Guedalia ................. H04W 4/21 709/224 |
| 2015/0006308 | A1* | 1/2015 | Lin .................... G06Q 30/0605 705/26.2 |
| 2015/0039458 | A1* | 2/2015 | Reid .................. G06K 9/00771 705/26.1 |
| 2017/0091850 | A1* | 3/2017 | Alvarez ............. G06Q 30/0633 |
| 2017/0228804 | A1* | 8/2017 | Soni ................... G06Q 30/0641 |
| 2018/0047017 | A1* | 2/2018 | Li ........................... G06Q 20/42 |
| 2018/0225623 | A1 | 8/2018 | Mosier et al. |
| 2018/0232796 | A1* | 8/2018 | Glaser ................... G06Q 90/20 |

OTHER PUBLICATIONS

Anonymous "Method for Automated Retail Checkout using RFID", IP.com No. IPCOM000241689D; Publication Date: May 21, 2015; 2 pgs.

Anonymous "Radio Frequency Retail System", IP.com; IP.com No. IPCOM000208870D; Publication Date: Jul. 20, 2011; 5 pgs.

Frost & Sullivan; 2017 Global Self-Checkout Systems Growth Excellence Leadership Award; Diebold/Nixdorf, Best Practices Research; 2017; 11 pgs.

Hartman, Tycho "A Hybrid Checkout System" Final report of bachelor assignment for Industrial Design; Student No. s0095184; Jun. 24, 2008; 56 pgs.

IBM "Distributed self checkout system", IP.com; An IP.com Prior Art Database Technical Disclosure; IP.com No. IPCOM000142391D; Publication Date Oct. 26, 2006; 3 pgs.

List of IBM Patents or Patent Applications Treated as Related; (Appendix P), Filed May 25, 2018; 2 pages.

Yuk L. Chan, et al., "Customer Tracking and Inventory Management in a Smart Store", U.S. Appl. No. 15/989,343, filed May 25, 2018.

Stack Overflow "How can I write cdata on UHF RFID tags?", retrieved from https://stackoverflow.com/questions/18031632/how-can-i-write-data-on-uhf-rhd-tags; retrieved on Jan. 27, 2020; 8 pgs.

* cited by examiner

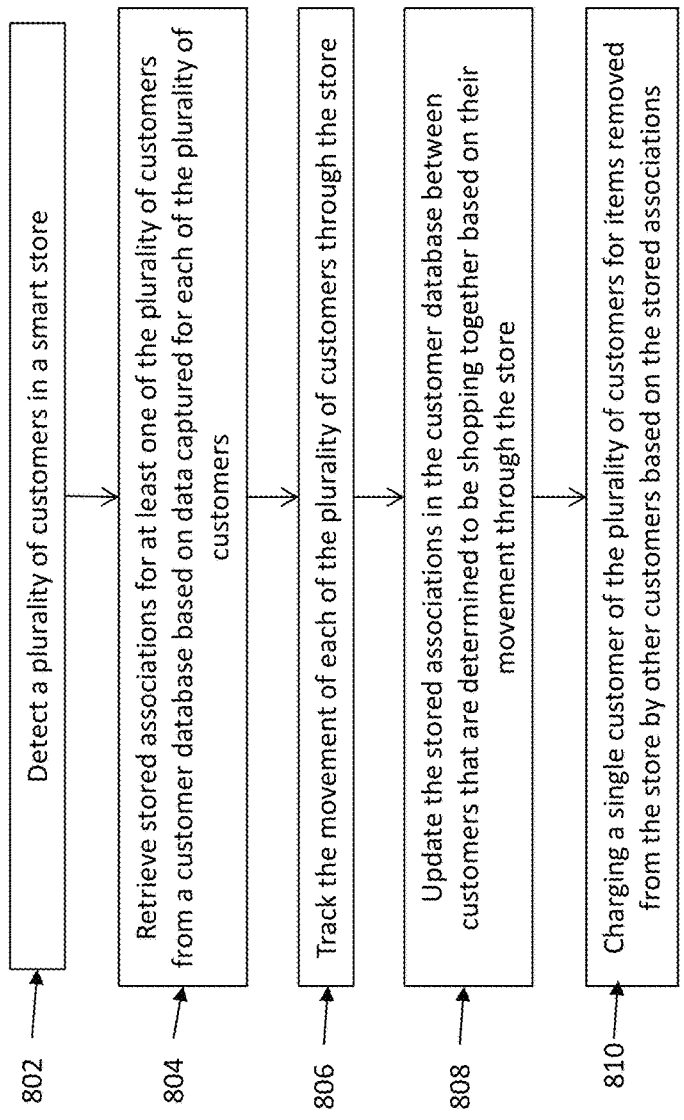

CUSTOMER TRACKING AND INVENTORY MANAGEMENT IN A SMART STORE

BACKGROUND

The invention relates generally to the operation of a store with seamless checkout and, more specifically, to tracking customers in a store and managing the inventory of the store by detecting items brought into the store by a customer.

Recently, retail stores have been developed in which a customer can simply pick up the items that they wish to purchase and walk out of the store with them. These stores use various techniques to detect the items that the user removes and charges the user for the items. However, such store configurations face several challenges that have slowed the adoption of this model.

SUMMARY

According to an embodiment, a system for identifying customer groups in a smart store is provided. The system includes a memory having computer readable computer instructions, and a processor for executing the computer readable instructions. The computer readable instructions include detecting, via one or more sensors in communication with a processor, a plurality of customers in a smart store. The computer readable instructions also include retrieving stored associations for at least one of the plurality of customers from a customer database stored in a memory based on data captured for each of the plurality of customers. The computer readable instructions include tracking a movement of each of the plurality of customers through the smart store. The computer readable instructions further include updating the stored associations in the customer database between two or more of the plurality of customers that are determined to be shopping together based on their movement through the smart store. The computer readable instructions also include charging a single customer of the plurality of customers for items removed from the smart store by another customer based on the stored associations.

According to another embodiment, a method for identifying customer groups in a smart store is provided. The method includes detecting, via one or more sensors in communication with a processor, a plurality of customers in a smart store. The method also includes retrieving stored associations for at least one of the plurality of customers from a customer database stored in a memory based on data captured for each of the plurality of customers. The method includes tracking a movement of each of the plurality of customers through the smart store. The method further includes updating the stored associations in the customer database between two or more of the plurality of customers that are determined to be shopping together based on their movement through the smart store. The method also includes charging a single customer of the plurality of customers for items removed from the smart store by another customer based on the stored associations.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes detecting, via one or more sensors in communication with a processor, a plurality of customers in a smart store. The method also includes retrieving stored associations for at least one of the plurality of customers from a customer database stored in a memory based on data captured for each of the plurality of customers. The method includes tracking a movement of each of the plurality of customers through the smart store. The method further includes updating the stored associations in the customer database between two or more of the plurality of customers that are determined to be shopping together based on their movement through the smart store. The method also includes charging a single customer of the plurality of customers for items removed from the smart store by another customer based on the stored associations.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

FIG. 8 depicts a flow diagram of another method for identifying customer groupings in a smart store according to one or more embodiments of the present invention.

DETAILED DESCRIPTION

Figure 1:
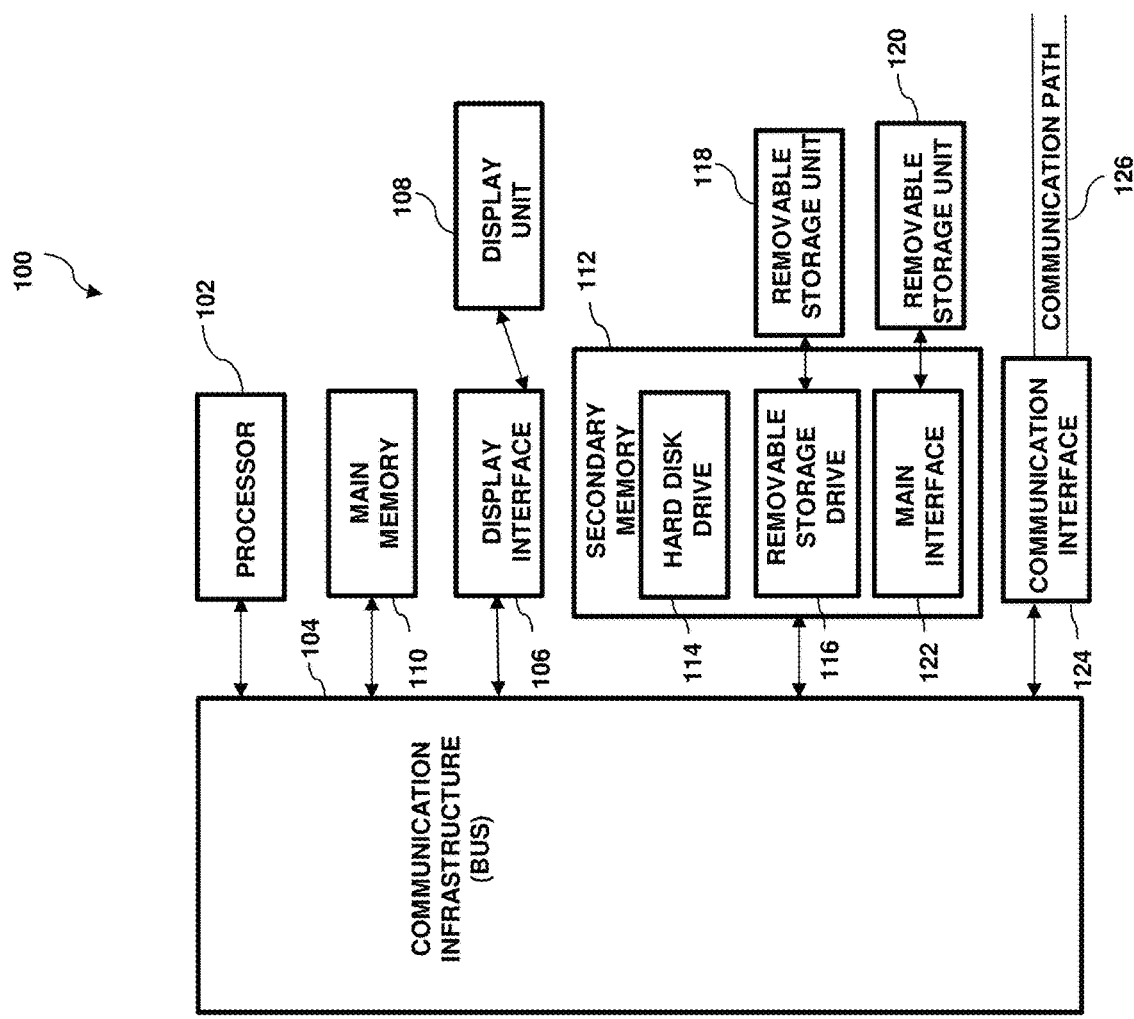
FIG. 1 depicts an exemplary computer system capable of implementing one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to a more detailed description of aspects of the present invention, FIG. 1 illustrates a high-level block diagram showing an example of a computer-based system 100 useful for implementing one or more embodiments of the invention. Although one exemplary computer system 100 is shown, computer system 100 includes a communication path 126, which connects computer system 100 to additional systems and may include one or more wide area networks (WANs) and/or local area networks (LANs) such as the internet, intranet(s), and/or wireless communication network(s). Computer system 100 and additional systems are in communication via communication path 126, (e.g., to communicate data between them).

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a floppy disk drive, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by a removable storage drive 116. As will be appreciated, removable storage unit 118 includes a computer readable medium having stored therein computer software and/or data.

In some alternative embodiments of the invention, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etc. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110, and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

In exemplary embodiments, methods, systems, and computer program products for tracking customers and managing inventory in a smart store are provided. As used herein the term smart store refers to a retail store in which a customer can pick-up desired items, leave the store and be charged for the items without having to go through a checkout process. In one embodiment, the smart store includes a combination of various sensors that are used to track the movement of inventory and customers throughout the store. These sensors can identify users and can detect when a customer picks up an item and removes it from the store.

Figure 2:
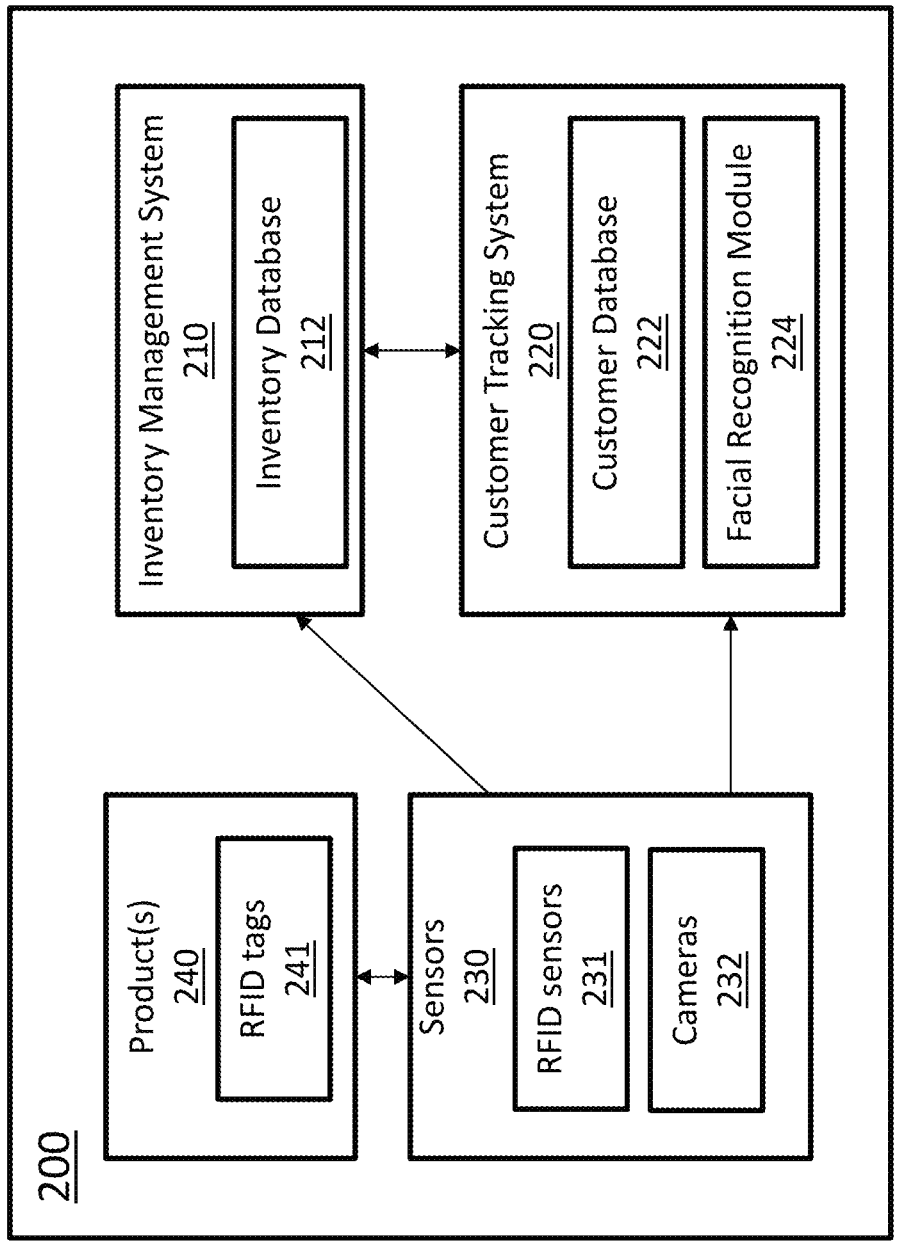
FIG. 2 depicts a system for tracking customers and managing inventory in a smart store according to one or more embodiments of the present invention.

Turning now to FIG. 2, a system 200 for tracking customers and managing inventory in a smart store will now be described in accordance with an embodiment. The system 200 includes an inventory management system 210, a customer tracking system 220, a plurality of products 240, and a plurality of sensors 230. In exemplary embodiments, the inventory management system 210 is configured to receive information from the various sensors 230 located throughout the store to track the movement of the products 240 and to detect when products are brought into, or removed from, the store. Likewise, the customer tracking system 220 is configured to receive information from the various sensors 230 located throughout the store and to identify the customers and track their movements throughout the store. In exemplary embodiments, the customer tracking system 220 is further configured to identify customers that are shopping together and to manage a customer database that includes stored information regarding the customers. Although illustrated as separate systems, the inventory management system 210 and the customer tracking system 220 may be embodied as a single computing system, such as the one shown in FIG. 1.

In exemplary embodiments, each of the plurality of products 240, which comprise the inventory of the store, include a radio-frequency identification (RFID) tag 241 that is used to identify the product. In one embodiment, the RFID tags 241 are reprogrammable passive tags. However, it will be appreciated by those of ordinary skill in the art that any known type of RFID tags 241 can be used. The sensors 230 include, but are not limited to, RFID sensors 231 and cameras 232 that are located at various locations throughout the store. The RFID sensors 231 can include RFID tag readers that are configured to read RFID tags 241 and can also be configured to write data to the RFID tags 241.

In exemplary embodiments, the inventory management system 210 includes an inventory database 212 which stores information regarding each of the products 240 in the store and the RFID tag 241 associated with each of the products 240. The inventory management system 210 is configured to detect the movement of the products 240 through the store and to remove/add products to the inventory as they are removed from, or brought into, the store. In one embodiment, the inventory management system 210 may utilize the RFID sensors 231 to write data to the RFID tag 241 of a product as it is brought into, or removed from, the store.

In exemplary embodiments, the customer tracking system 220 includes a facial recognition module 224 and a customer database 222. The customer database 222 is configured to store information regarding customers that includes, but is not limited to, a customer facial image, a customer name, a customer identification number, a purchase history of the customer, a payment method for the customer, one or more additional customers that the customer is associated with and charging authorizations of the one or more additional customers. In exemplary embodiments, the facial recognition module 224 is configured to receive images of customers in the store from the cameras 232 and to identify the customer in the customer database 222. In cases when the customer is not in the customer database 222, the customer tracking system 220 is configured to create a new customer record in the customer database 222. In exemplary embodiments, additional methods can be used to identify customers in the store. For example, customers may have membership cards that include RFID tags that can read by the RFID sensors 231. As will be discussed in further detail below, the customer tracking system 220 is configured to identify customers that are shopping together based on their movements through the store.

Figure 3:
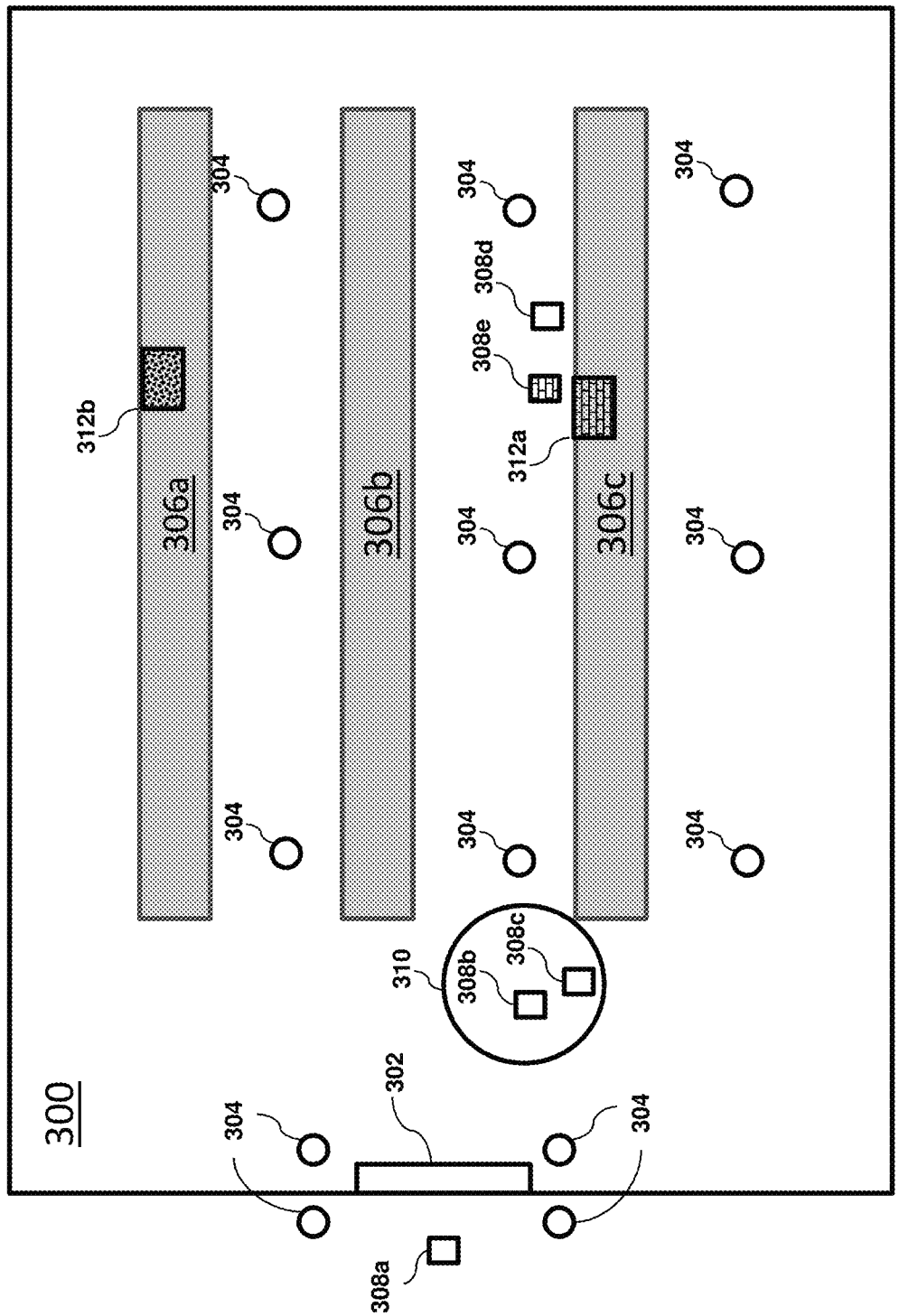
FIG. 3 depicts a schematic of a smart store according to one or more embodiments of the present invention.

Turning now to FIG. 3 a schematic of a smart store 300 according to one or more embodiments of the present invention is shown. The smart store 300 includes a doorway 302, a plurality of sensors 304 disposed throughout the store, a plurality of shelves 306a, 306b and 306c upon which various products 312a, 312b can be stored. In exemplary embodiments, the sensors 304 are used to track the movements of customers 308a, 308b, 308c, 308d, and 308e as they move through the store. As illustrated, the customer tracking system can classify customers 308b and 308c in a group 310 based on their movements through the store or based on information stored in the customer database. In exemplary embodiments, customer groups are groups of customers for which items removed from the store by one group member are charged to another group member.

In addition, the customer tracking system can identify and track a customer 308e that has brought items into the store and can detect when the customer 308e approaches an area of the store 300 in which the same, or similar, products 312a are kept. In exemplary embodiments, the customer tracking system can apply increased surveillance to customer 308e when it is determined that the customer 308e is approaching the area of the store 300 in which the same, or similar, products 312a are kept in order to detect potential fraud. For example, if a customer is detected entering the store with lipstick that is sold by the store, the customer tracking system will apply enhanced surveillance to the customer when she is in the area of the store that the lipstick is stocked to be able to detect if the customer attempts to swap the item brought into the store for another identical or similar item.

Figure 4:
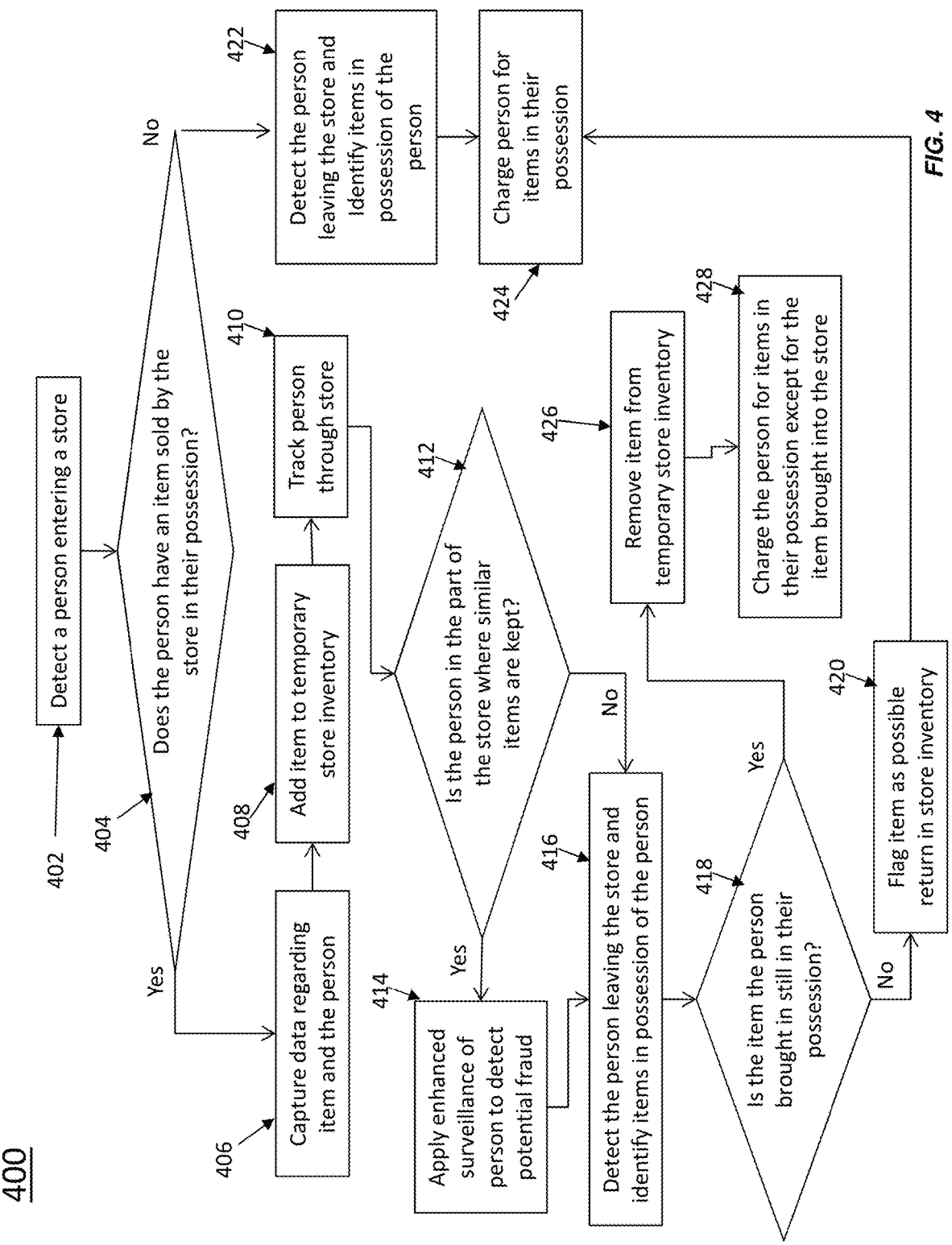
FIG. 4 depicts a flow diagram of a method for inventory management in a smart store according to one or more embodiments of the present invention.

Turning now to FIG. 4 a flow diagram of a method 400 for inventory management in a smart store according to one or more embodiments is shown. The method 400 includes detecting a person entering a store. Next, as shown at decision block 404, the method 400 includes determining if the person has an item sold by the store in their possession when they enter the store. In an exemplary embodiment, the person can be detected entering the store by using cameras and the presence of an item on the person can be detected using RFID sensors, cameras, or other types of sensors. If the person has an item sold by the store in their possession when they enter the store, the method proceeds to block 406 and captures data regarding the item and the person. The data can include, but is not limited to, an RFID tag number for the item. Next, as shown at block 408, the method 400 includes adding the item to a temporary store inventory table in an inventory database. The method 400 also includes tracking the movements of the person through the store, as shown at block 410.

As shown at decision block 412, the method 400 includes determining if the person is in an area of the store in which items similar to the item in their possession when they entered the store are located. If the person is in an area of the store in which items similar to the item in their possession when they entered the store are located, the method 400 includes applying enhanced surveillance of the person to detect potential fraud. Otherwise, the method 400 proceeds to block 416 and detects the person leaving the store and identifies items in possession of the person. Next, as shown at decision block 418, the method 400 includes determining if the person still has the item in their possession that they had when they entered the store. If the person still has the item in their possession that they had when they entered the store, the method 400 proceeds to block 426 and removes the item from the temporary inventory of the store. Next, as shown at block 428 the method 400 includes charging the person for items in their possession except for the item the person brought into the store. If the person does not still have the item in their possession that they had when they entered the store, the method 400 proceeds to block 420 and flags the item as a potential returned item.

If the person does not have an item sold by the store in their possession when they enter the store, the method proceeds to block 422 and detects the person leaving the store and identifies items in possession of the person. The method 400 then proceeds to block 424 and charges the person for items in their possession.

In exemplary embodiments, when multiple customers enter the store at the same time and one of them has an item with an RFID tag on it may be difficult to determine which customer is in possession of the item. In these cases, the purchase history of the known customers can be accessed and if one of the customers previously purchased the item it can be assumed that the item is in the possession of that customer.

Figure 5:
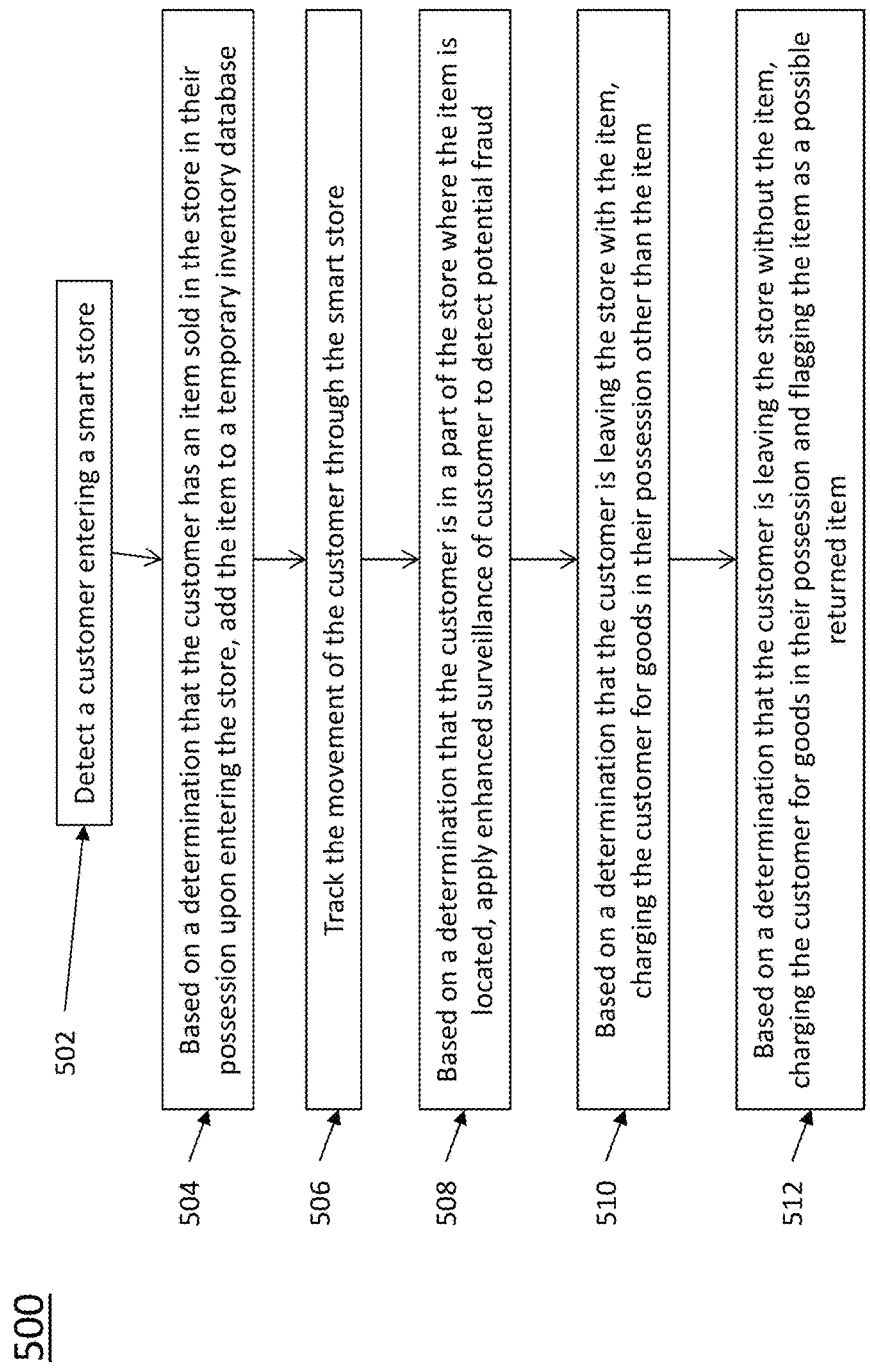
FIG. 5 depicts a flow diagram of another method for inventory management in a smart store according to one or more embodiments of the present invention.

Referring now to FIG. 5 a flow diagram of another method 500 for inventory management in a smart store according to one or more embodiments is shown. The method 500 includes detecting a customer entering a smart store. Next, as shown at block 504, the method 500 includes adding an item to a temporary inventory database based on a determination that the customer has an item sold in the store in their possession upon entering the store. The method 500 also includes tracking the movement of the customer through the smart store, as shown at block 506. Next, as shown at block 508, the method 500 includes applying enhanced surveillance of customers to detect potential fraud based on a determination that the customer is in a part of the store where the item is located. Based on a determination that the customer is leaving the store with the item, the method 500 includes charging the customer for goods in their possession other than the item, as shown at block 510. Based on a determination that the customer is leaving the store with additional good and the item, the method 500 includes charging the customer for goods in their possession and the item. Based on a determination that the customer is leaving the store without the item and the enhanced surveillance detected the customer returned the item, the method 500 includes charging the customer for goods in their possession and flagging the item as a returned item, as shown at block 512. Based on a determination that the customer is leaving the store without the item and the enhanced surveillance did not detected the customer returned the item, the method 500 includes charging the customer for goods in their possession and concludes the other customers entered the store together might have the item.

Figure 6:
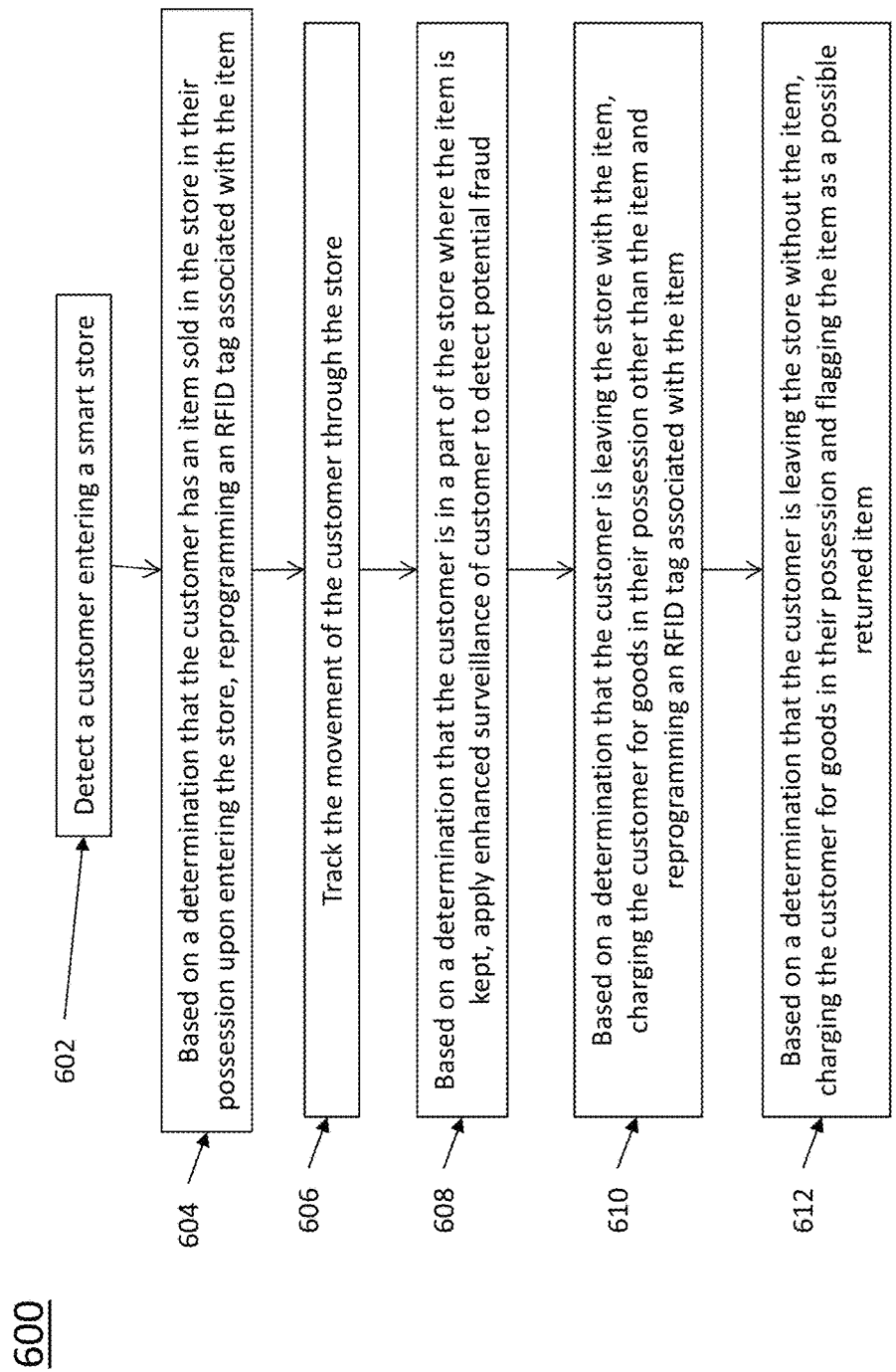
FIG. 6 depicts a flow diagram of a further method for inventory management in a smart store according to one or more embodiments of the present invention.

Referring now to FIG. 6 a flow diagram of a further method 600 for inventory management in a smart store according to one or more embodiments is shown. The method 600 includes detecting a customer entering a smart store. Next, as shown at block 604, the method 600 includes detecting a customer entering a smart store. Next, as shown at block 604, the method 600 includes reprogramming an RFID tag associated with the item based on a determination that the customer has an item sold in the store in their possession upon entering the store. The method 600 also includes tracking the movement of the customer through the smart store, as shown at block 606. Next, as shown at block 608, the method 600 includes applying enhanced surveillance of customers to detect potential fraud based on a determination that the customer is in a part of the store where the item is located. Based on a determination that the customer is leaving the store with the item, the method 600 includes charging the customer for goods in their possession other than the item and reprogramming an RFID tag associated with the item, as shown at block 610. Based on a determination that the customer is leaving the store without the item, the method 600 includes charging the customer for goods in their possession and flagging the item as a possible returned item, as shown at block 612.

Figure 7:
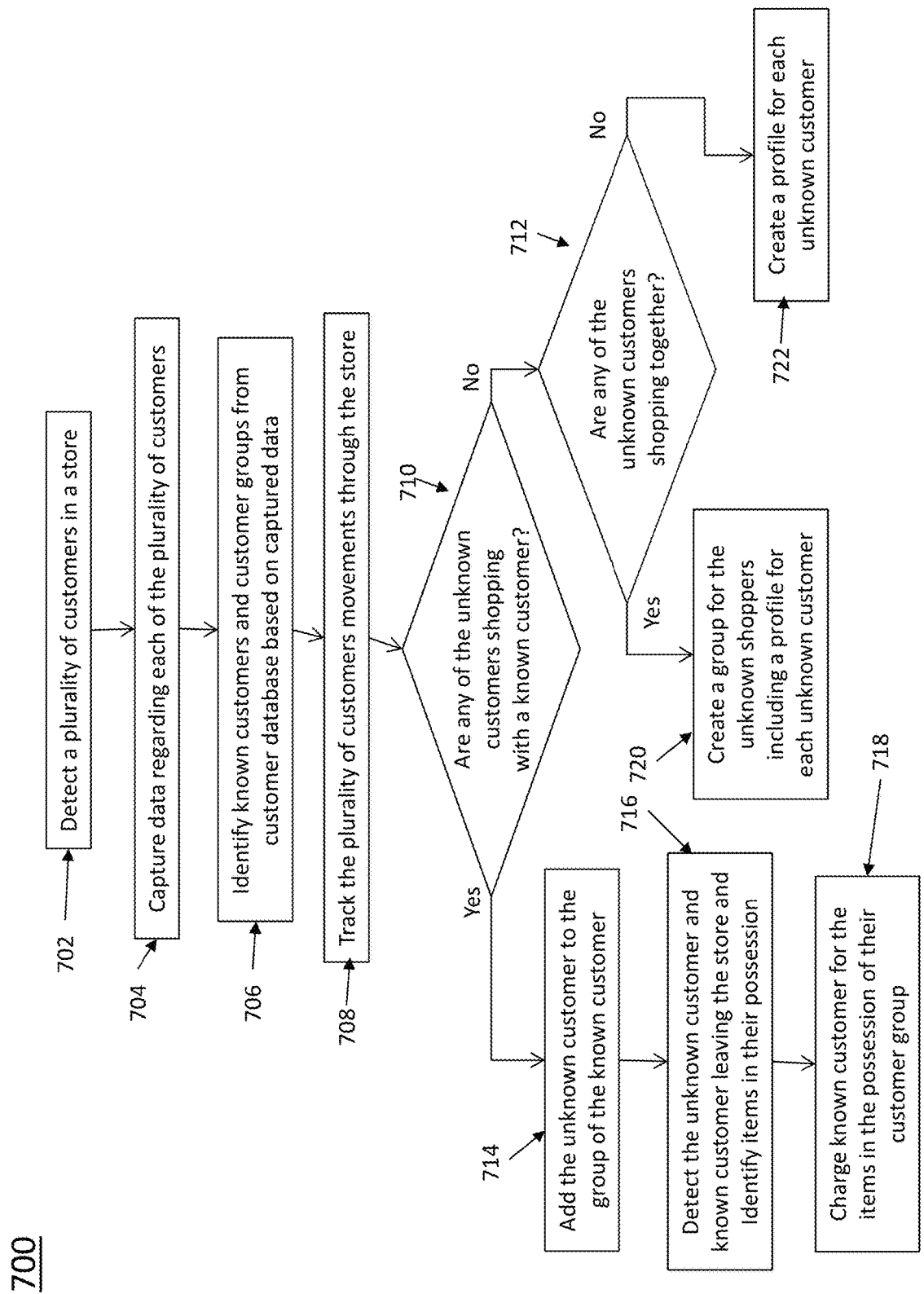
FIG. 7 depicts a flow diagram of a method for identifying customer groupings in a smart store according to one or more embodiments of the present invention.

Turning now to FIG. 7 a flow diagram of a method 700 for identifying customer groupings in a smart store according to one or more embodiments is shown. The method 700 includes detecting a plurality of customers in the smart store, as shown at block 702. Next, as shown at block 704, the method 700 includes capturing data regarding each of the plurality of customers. In exemplary embodiments, the captured data can include images of the customers, customer identification numbers associated with the customer from a membership card, or the like. Next, as shown at block 706, the method 700 includes identifying known customers and customer groups from a customer database based on the captured data. The method 700 also includes tracking the movements of the plurality of customers through the store.

As shown at decision block 710, the method 700 includes determining if any of the unknown customers are shopping with a known customer. In exemplary embodiments, this determination can be made based on analyzing the movements of the customers through the store. For example, customers that enter the store at the same time and that move through the store together can be determined to be shopping together. If an unknown customer is shopping with a known customer, the method 700 proceeds to block 714 and adds the unknown customer to a customer group of the known customer. In exemplary embodiments, authorization from the known customer can be required before adding the unknown customer to the customer group of the known customer. This authorization can be a temporary authorization, i.e., for this trip, or a permanent authorization. Furthermore, the requested authorization can include an option for the known customer to specify a duration for which the unknown customer will be on the authorized user list of the known customer. The authorization can be obtained by sending the known customer an email, text message, or notification in a shopping application. Next, as shown at block 716, the method 700 includes detecting the unknown customer and known customer leaving the store and identifying items in their possession. The known customer is then charged for the items in the possession of the members of their customer group, including the unknown customer, as shown at block 718. Additional authorization can be required from the known customer when the unknown customer leave the store. In exemplary embodiments, the authorization can include the total cost, a list of items, a category of items (such as alcohol, cigarette), and the known customer can authorized the payment for subset of items.

If an unknown customer is not shopping with a known customer, the method 700 proceeds to decision block 712 and determines if the unknown customer is shopping with additional unknown customers. If the unknown customer is shopping with additional unknown customers, the method proceeds to block 720 and creates a group for the unknown shoppers including a profile for each unknown customer. Otherwise, the method 700 proceeds to block 722 and creates a profile for each unknown customer.

In exemplary embodiments, the profile for an unknown shopper can be set up based on captured data for the customer such as an image of their face, categories of interested item. As the customer moves through the store, when they pass a signup kiosk, the user can be prompted to complete their customer profile by entering their name, preferred payment information, an email address, the names and associations of authorized additional customers and the like.

In exemplary embodiments, the determination that customers are shopping together can be based at least in part on when the customers entered the smart store, i.e., did the customers enter the store at the same time. In addition, the determination that customers are shopping together can be based at least in part on any observed interactions among the customers while in the smart store and/or on a similarity of a path taken through the smart store by the customers.

FIG. 8 depicts a flow diagram of another method 800 for identifying customer groupings in a smart store according to one or more embodiments is shown. The method 800 includes detecting a plurality of customers in a smart store. Next, as shown at block 804, the method 800 includes retrieving stored associations for at least one of the plurality of customers from a customer database stored in the memory based on data captured for each of the plurality of customers. In exemplary embodiments, the captured data can include facial recognition data of the customer, an identification number of the customer, or the like. Next, as shown at block 806, the method 800 includes tracking the movement of each of the plurality of customers through the store. The method 800 also includes updating the stored associations in the customer database between customers that are determined to be shopping together based on their movement through the store. Next, as shown at block 810, the method 800 includes charging a single customer of the plurality of customers for items removed from the store by other customers based on the stored associations.

In exemplary embodiments, the determination that customers are shopping together can be based at least in part on the historical relationship: i.e., did the customers show together in the past, and did one of the known customer paid for the other customers. In addition, the determination of customers identify can based on images captured in the past. For example, Alan and Beth were determined to be shopped together in the past, and Alan paid for Beth's purchases. Now, Customer A and Customer B entered the store at different time. Based on facial recognition using historical images, Customer A is recognized as Alan, and Customer B is recognized as Beth. Since Alan and Beth might be shopping together, depending on the profile settings Alan might be configured to pay for Beth's purchases. In a different embodiment, confirmation might be requested from Alan for the payment of Beth's purchases.

In exemplary embodiments, the associations between customers can be identified, and/or verified, by searching social media sites for images of the customers and identifying relationships between the users. For example, Beth might be identified as Alan's daughter, and this increases the confident level that Alan might be willing to pay for Beth.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for identifying customer groupings in a smart store, comprising:
    a memory having computer readable instructions; and
    a processor for executing the computer readable instructions, the computer readable instructions including instructions for:
    detecting, via one or more sensors in communication with the processor, a plurality of customers in the smart store, wherein a first customer of the plurality of customers entered the smart store with an item sold by the smart store in their possession;
    retrieving stored associations for at least one of the plurality of customers from a customer database stored in the memory based on data captured for each of the plurality of customers, wherein the stored associations include an identity of one or more individuals authorized to purchase items on behalf of a customer;
    tracking a movement of each of the plurality of customers through the smart store;
    requesting authorization from the first customer to add another customer to an authorized user list of the first customer prior to charging the first customer, wherein the requested authorization includes an option for the first customer to specify whether the requested authorization is a permanent authorization or a temporary authorization and to specify a duration for which the other customer will be on the authorized user list of the first customer;
    updating the stored associations in the customer database between two or more of the plurality of customers that are determined to be shopping together based on observed interactions among the customers while in the smart store;
    based on a determination that the first customer is leaving the smart store without the item and that an enhanced surveillance detected the first customer returning the item, charging the first customer of the plurality of customers for items removed from the smart store by another customer based on the stored associations and flagging the item as a returned item.

2. The system of claim 1, wherein the memory includes a customer database that includes identifying information for each known customer.

3. The system of claim 2, wherein the identifying information includes an image of a face of a customer.

4. The system of claim 2, wherein the customer database includes the stored associations for each known customer and a stored payment method for each known customer.

5. The system of claim 2, wherein the determination that customers are shopping together is based at least in part on when the customers entered the smart store, and on a similarity of a path taken through the smart store by the customers.

6. A method for identifying customer groupings in a smart store, comprising:
    detecting, via one or more sensors in communication with a processor, a plurality of customers in the smart store, wherein a first customer of the plurality of customers entered the smart store with an item sold by the smart store in their possession;
    retrieving stored associations for at least one of the plurality of customers from a customer database stored in a memory based on data captured for each of the plurality of customers, wherein the stored associations include an identity of one or more individuals authorized to purchase items on behalf of a customer;
    tracking a movement of each of the plurality of customers through the smart store;
    requesting authorization from the first customer to add an other customer to an authorized user list of the first customer prior to charging the first customer, wherein the requested authorization includes an option for the first customer to specify whether the requested authorization is a permanent authorization or a temporary authorization and to specify a duration for which the other customer will be on the authorized user list of the first customer;

updating the stored associations in the customer database between two or more of the plurality of customers that are determined to be shopping together based on observed interactions among the customers while in the smart store; and based on a determination that the first customer is leaving the smart store without the item and that an enhanced surveillance detected the first customer returning the item, charging a first customer of the plurality of customers for items removed from the smart store by another customer based on the stored associations and flagging the item as a returned item.

7. The method of claim 6, wherein the memory includes a customer database that includes identifying information for each known customer.

8. The method of claim 7, wherein the identifying information includes an image of a face of a customer.

9. The method of claim 7, wherein the customer database includes the stored associations for each known customer and a stored payment method for each known customer.

10. The method of claim 7, wherein the determination that customers are shopping together is based at least in part on when the customers entered the smart store, and on a similarity of a path taken through the smart store by the customers.

11. A computer program product comprising a computer readable storage medium having program instructions embodied therewith the program instructions executable by a computer processor to cause the computer processor to perform a method, comprising:

detecting, via one or more sensors in communication with a processor, a plurality of customers in a smart store, wherein a first customer of the plurality of customers entered the smart store with an item sold by the smart store in their possession;

retrieving stored associations for at least one of the plurality of customers from a customer database stored in a memory based on data captured for each of the plurality of customers, wherein the stored associations include an identity of one or more individuals authorized to purchase items on behalf of a customer;

tracking a movement of each of the plurality of customers through the smart store;

requesting authorization from the first customer to add an other customer to an authorized user list of the first customer prior to charging the first customer, wherein the requested authorization includes an option for the first customer to specify whether the requested authorization is a permanent authorization or a temporary authorization and to specify a duration for which the other customer will be on the authorized user list of the first customer;

updating the stored associations in the customer database between two or more of the plurality of customers that are determined to be shopping together based on observed interactions among the customers while in the smart store; and based on a determination that the first customer is leaving the smart store without the item and that an enhanced surveillance detected the first customer returning the item, charging a first customer of the plurality of customers for items removed from the smart store by another customer based on the stored associations and flagging the item as a returned item.

12. The computer program product of claim 11, wherein the memory includes a customer database that includes identifying information for each known customer.

13. The computer program product of claim 12, wherein the identifying information includes an image of a face of a customer.

14. The computer program product of claim 12, wherein the customer database includes the stored associations for each known customer and a stored payment method for each known customer.

* * * * *